United States Patent
Gong et al.

(10) Patent No.: US 8,982,758 B2
(45) Date of Patent: Mar. 17, 2015

(54) TECHNIQUES FOR EFFICIENT ACKNOWLEDGEMENT FOR UL MU MIMO AND UPLINK OFDMA IN WIRELESS NETWORKS

(75) Inventors: Michelle X. Gong, Sunnyvale, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 12/798,069

(22) Filed: Mar. 29, 2010

(65) Prior Publication Data

US 2011/0235593 A1 Sep. 29, 2011

(51) Int. Cl.
| | |
|---|---|
| H04H 20/71 | (2008.01) |
| H04W 4/00 | (2009.01) |
| H04W 84/02 | (2009.01) |
| H04L 1/16 | (2006.01) |
| H04B 7/04 | (2006.01) |
| H04L 1/00 | (2006.01) |
| H04W 28/02 | (2009.01) |

(52) U.S. Cl.
CPC ............ *H04L 1/1614* (2013.01); *H04B 7/0452* (2013.01); *H04L 2001/0093* (2013.01); *H04W 28/02* (2013.01)
USPC .......................... 370/312; 370/329; 370/338

(58) Field of Classification Search
CPC ................. H04L 1/1614; H04L 2001/0093; H04B 7/0452; H04W 28/02
See application file for complete search history.

(56) References Cited

U.S. PATENT DOCUMENTS

| | | | |
|---|---|---|---|
| 5,528,605 A | 6/1996 | Ywoskus et al. | |
| 2006/0034274 A1* | 2/2006 | Kakani et al. | 370/389 |
| 2006/0221879 A1* | 10/2006 | Nakajima et al. | 370/310 |
| 2008/0181162 A1 | 7/2008 | Stephens et al. | |
| 2009/0116416 A1* | 5/2009 | Sekiya | 370/310 |
| 2009/0252110 A1* | 10/2009 | Sridhara et al. | 370/330 |
| 2009/0252143 A1* | 10/2009 | Sridhara et al. | 370/345 |
| 2010/0008318 A1* | 1/2010 | Wentink et al. | 370/329 |
| 2010/0014448 A1* | 1/2010 | Wentink et al. | 370/311 |
| 2010/0046453 A1* | 2/2010 | Jones et al. | 370/329 |
| 2010/0177757 A1* | 7/2010 | Kim et al. | 370/338 |
| 2010/0220678 A1* | 9/2010 | Wentink | 370/329 |
| 2010/0284393 A1* | 11/2010 | Abraham et al. | 370/343 |

(Continued)

FOREIGN PATENT DOCUMENTS

| | | |
|---|---|---|
| JP | 2007-502079 A | 2/2007 |
| WO | 02/41647 A2 | 5/2002 |
| WO | 2005/015812 A1 | 2/2005 |
| WO | 2011/126851 A2 | 10/2011 |
| WO | 2011/126851 A3 | 1/2012 |

OTHER PUBLICATIONS

Sampath, Method and Apparatus for Multicast Block Acknowledgment, Dec. 8, 2009, pp. 1-44.*

(Continued)

*Primary Examiner* — Steven H Nguyen
(74) *Attorney, Agent, or Firm* — Ellis B. Ramirez

(57) ABSTRACT

An embodiment of the present invention provides a method of supporting acknowledgement transmissions for Uplink (UL) Multi-user Multiple Input Multiple Output (MU MIMO) in wireless networks, comprising, enabling an AP operable in the wireless network to send back acknowledgements to different wireless stations (STAs) in communication with said AP either sequentially or simultaneously by defining a new block ack (BAs) type for multiple STAs.

20 Claims, 4 Drawing Sheets

400

| STA-ID | BA STARTING SEQUENCE CONTROL | BA BITMAP |
|---|---|---|

(56) References Cited

U.S. PATENT DOCUMENTS

2010/0329236 A1* 12/2010 Sampath et al. ............. 370/350
2011/0051647 A1* 3/2011 Sampath et al. ............. 370/312
2011/0090855 A1* 4/2011 Kim ............................. 370/329
2011/0286377 A1* 11/2011 Sampath et al. ............. 370/312
2012/0314697 A1* 12/2012 Noh et al. .................... 370/338

OTHER PUBLICATIONS

International Search Report and Written Opinion received in PCT Application Serial No. PCT/US2011/030362, mailed Nov. 25, 2011, 10 pages.

Michelle Gong, et al. "DL MU MIMO Error Handling and Simulation Results", IEEE 802 11-10/0324r0, Mar. 15, 2012, slides 4-6.

Richard van Nee, et al. "Strawmodel 802 11ac Specification Framework", IEEE 802 11-09/0633r0, May 13, 2009, slides 5, 15, 17.

Office Action Received for Japanese Patent Application No. 2011-057901, mailed on Sep. 4, 2012, 4 pages Office Action and 4 page of English Translation.

International Preliminary Report on Patentability Received for PCT Patent Application No. PCT/US2011/030362, mailed on Oct. 11, 2012, 5 pages.

Office Action received for Chinese Patent Application No. 201110084901.X, mailed on Nov. 22, 2013, 12 pages of Office Action Including 7 pages of English Translation.

Office Action received for Chinese Patent Application No. 201110084901.X, mailed on Sep. 23, 2014, 8 pages of Office Action including 5 pages of English Translation.

* cited by examiner

TECHNIQUES FOR EFFICIENT ACKNOWLEDGEMENT FOR UL MU MIMO AND UPLINK OFDMA IN WIRELESS NETWORKS

BACKGROUND

It is possible to increase the network capacity of a basic service set (BSS) using Uplink (UL) Multi-user Multiple Input, Multiple Output (MU MIMO). With UL MU MIMO, multiple STAs are permitted to simultaneously (in time and frequency) transmit to a multiple-antenna access point (AP) and the resulting signals are separated by the AP's MIMO equalizer. FIG. 1, shown generally as 100, shows an UL MU MIO procedure when explicit ack is utilized. If implicit ack is used, the STAs do not need to send the BAR frames. Upon receiving the data frames from the STAs, the AP sends back block acks (BAs) sequentially. BAs are separated by Reduced Inter Frame Space (RIFS).

Current wireless networks which operate in compliance with the existing Institute for Electronic and Electrical Engineers (802.11) standard do not support the use of UL MU MIMO and thus improvements are needed in UL MU MIMO techniques.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 6:
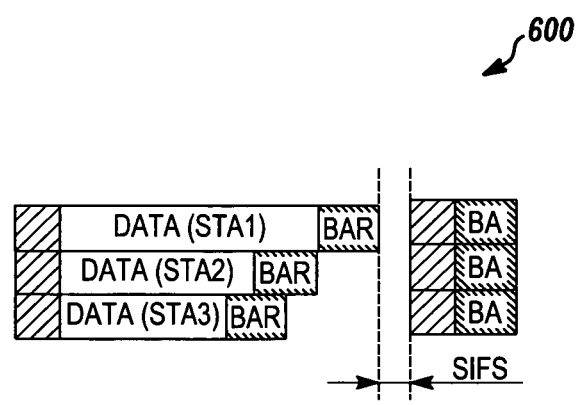
Figure 7:
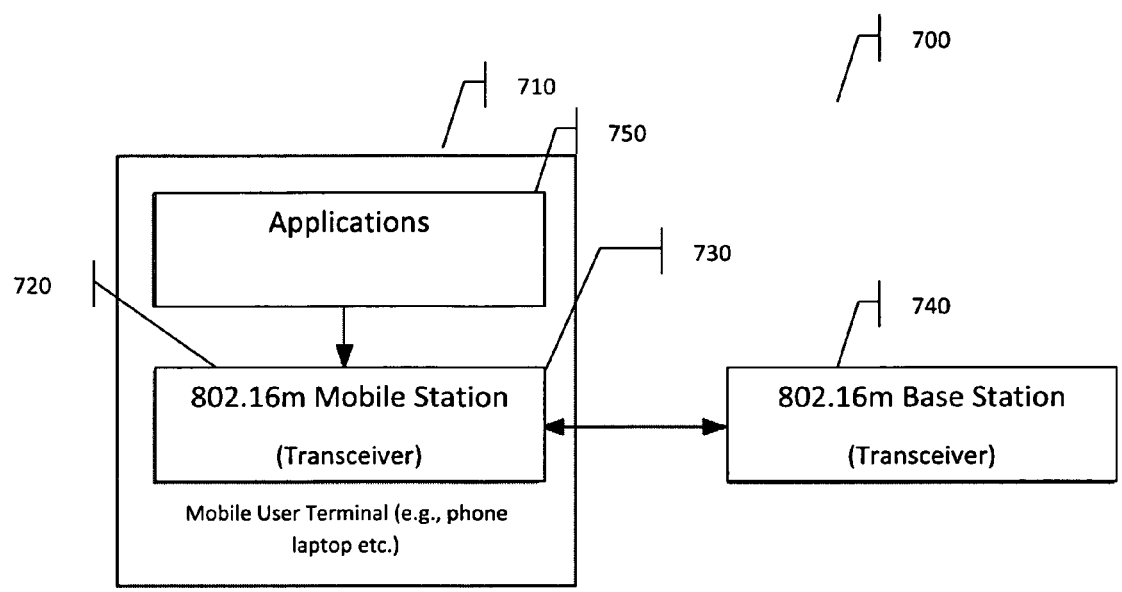

| STA-AID | STA BA Information | ... | STA-AID | STA BA Information | according to embodiments of the present invention;

FIG. 6 is an illustration of the UL MU MIMO or UL OFDMA procedure with DL MU MIMO support according to embodiments of the present invention; and FIG. 7 provides a system according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide solutions that support acknowledgement transmissions for Uplink (UL) Multi-user Multiple Input Multiple Output (MU MIMO) or UL OFDMA. It is possible to increase the network capacity of a basic service set (BSS) using Uplink (UL) Multi-user Multiple Input, Multiple Output (MU MIMO). With UL MU MIMO, multiple STAs are permitted to simultaneously (in time and frequency) transmit to a multiple-antenna AP and the resulting signals are separated by the AP's MIMO equalizer. As mentioned above, the current 802.11 standard does not define a multi-STA BA. However, embodiments of the present invention may define a multi-STA BA and a multi-STA multi-TID BA using mechanisms that enable the AP to send back BAs simultaneously for UL MU MIMO for improved MAC efficiency.

Figure 1:
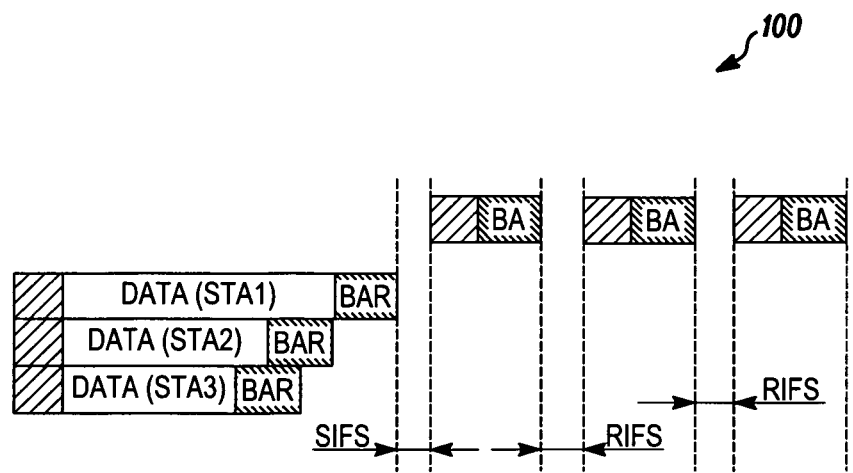
FIG. 1 is an illustration of UL MU MIMO or UL OFDMA (Explicit Ack) according to an embodiment of the present invention.

Looking again at FIG. 1 at 100 is an UL MU MIMO or UL OFDMA procedure when explicit ack is utilized according to embodiments of the present invention. If implicit ack is used, the STAs do not need to send the BAR frames. Upon receiving the data frames from the STAs, the AP sends back block acks (BAs) sequentially. BAs are separated by Reduced Inter Frame Space (RIFS).

Embodiments of the present invention provide mechanisms that enable an AP to send back acknowledgements to different STAs either sequentially or simultaneously. FIG. 1 illustrates a case when the AP transmits BAs sequentially for UL MU MIMO. To improve MAC efficiency, the AP may transmit one BA to acknowledge all data frames received in one UL MU MIMO transmission, although the present invention is not limited in this respect.

Figure 2:
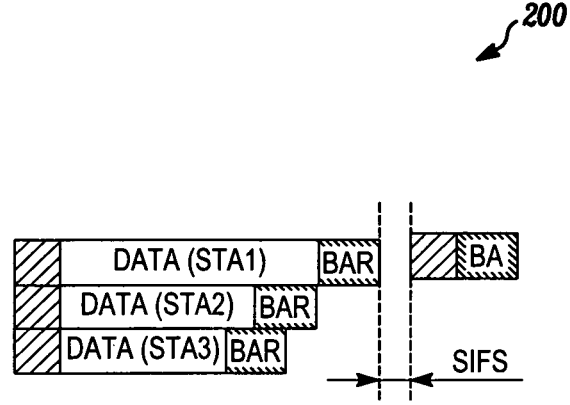
FIG. 2 is an illustration of the UL MU MIMO or UL OFDMA procedure with multi-STA BA variant according to embodiments of the present invention.
Figure 3:
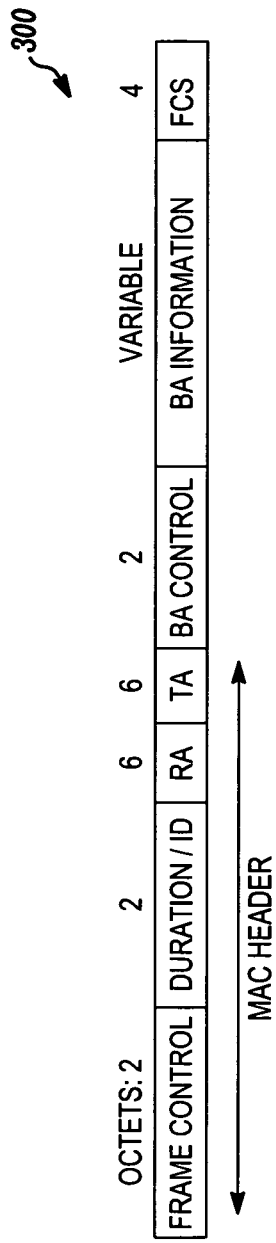
FIG. 3 provides a frame format of Block Ack according to embodiments of the present invention.

Looking at FIG. 2, 200, is an illustration of an UL MU MIMO procedure when a multi-STA BA is used. In this case, the AP broadcast or multicast one BA frame that contains information for all STAs from which the AP has received an A-MPDU previously. FIG. 3 at 300 shows a frame format of a Block Ack that may be utilized in embodiments of the present invention.

Figure 4:
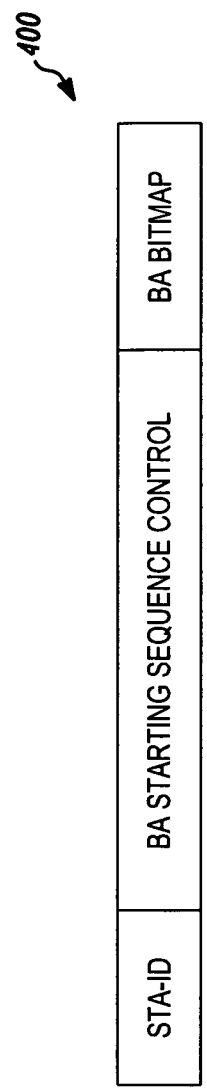
FIG. 4 provides a frame format of BA Information field (Multi-STA BA variant) according to embodiments of the present invention.

Embodiments of the present invention may define a new BA type for multiple STAs. The BA Information for a multi-STA BA variant is shown in FIG. 4 at 400. A multi-STA BA contains one BA information field for each STA.

Figure 5:
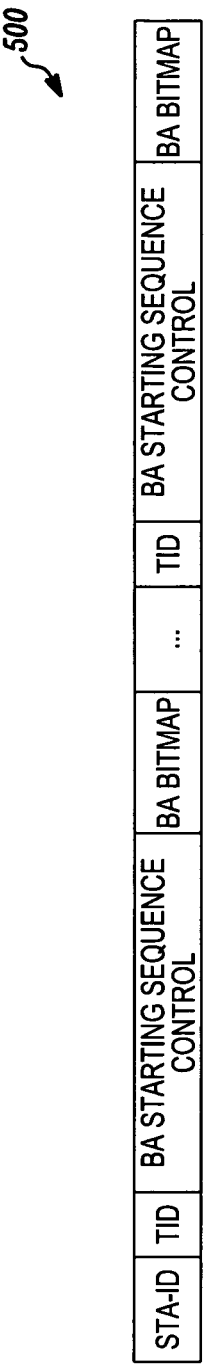
FIG. 5 provides a frame format of BA Information field (Multi-STA multi-TID BA variant)

In another embodiment of the present invention, a BA Information field for a multi-STA multi-TID BA is defined in FIG. 5, shown generally as 500.

Still another embodiment of the present invention is provided in FIG. 6 at 600, which illustrates a case when DL MU MIMO is supported, wherein the AP can send BAs to multiple STAs simultaneously. The BAs may be aggregated with data frames in this case.

Looking now at FIG. 7 at 700 is provided a system diagram according to embodiments of the present invention, in which a mobile station (MS—also referred to herein as STA) 720 and applications 730 are collocated in a mobile user terminal 710, such as, but not limited to mobile phone, laptop, PDA etc. MS and a base station (BS—also referred to herein as an access point (AP)) 740 may communicate wirelessly. Both MS and BS may utilize transceivers that operate according to the embodiments set forth herein.

A further embodiment of the present invention provides a computer readable medium encoded with computer executable instructions, which when accessed, cause a machine to perform operations comprising supporting acknowledgement transmissions for Uplink (UL) Multi-user Multiple Input Multiple Output (MU MIMO) in wireless networks by enabling an AP operable in the wireless network to send back acknowledgements to different wireless stations (STAs) in communication with the AP either sequentially or simultaneously by defining a new block ack (BAs) type for multiple STAs.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method of supporting acknowledgement transmissions comprising:
communicating using a wireless network that supports Uplink (UL) Multi-user Multiple Input Multiple Output (MU MIMO) or UL Orthogonal Frequency-Division Multiple Access (OFDMA);
enabling an access point (AP) operable in said wireless network to send back acknowledgements to different wireless stations (STAs) in communication with said AP either sequentially or simultaneously by defining a new block ack (BAs) type to acknowledge data frames received for multiple STAs, wherein the new BAs type contains a BA information field and a BA control field;
wherein with the new BAs type the AP may broadcast or multicast one BA frame that contains information for all STAs from which the AP has received an aggregate MAC protocol data unit (A-MPDU).

2. The method of claim 1, wherein a multi-STA BA contains one BA information field for each STA.

3. The method of claim 2, wherein said BA information field for said multi-STA BA variant comprises a STA-ID field, BA Starting Sequence Control field, and BA Bitmap field.

4. The method of claim 2, wherein said BA information field for said multi-STA BA variant comprises for each wireless station a STA-ID field, a Traffic Identifier (TID) field, BA Starting Sequence Control field, and BA Bitmap field.

5. The method of claim 1, wherein when DL MU MIMO is supported, said AP is capable of sending BAs to multiple STAs simultaneously and said BAs may be aggregated with data frames.

6. A mobile station (MS), comprising:
a transceiver adapted for communication with an access point (AP) in a wireless network, said AP including a transceiver adapted to support acknowledgement transmissions for Uplink (UL) Multi-user Multiple Input Multiple Output (MU MIMO) or UL OFDMA in said wireless network by enabling said AP to send back acknowledgements to different wireless stations (STAs) in communication with said AP either sequentially or simultaneously by defining a new block ack (BAs) type to acknowledge data frames received for multiple STAs, wherein the new BAs type contains a BA information field and a BA control field;
wherein with the new BAs type the AP may broadcast or multicast one BA frame that contains information for all STAs from which the AP has received an aggregate MAC protocol data unit (A-MPDU).

7. The MS of claim 6, wherein a multi-STA BA contains an STA Association ID (AID) field, and a BA information field for each STA.

8. The MS of claim 7, wherein said BA information field for said multi-STA BA comprises Station Identification (STA-ID) field, BA Starting Sequence Control field, and BA Bitmap field; and wherein BA information is capable of containing other fields or a said BA bitmap is capable of being in front of a BA starting sequence control.

9. The MS of claim 7, wherein said BA information field for said multi-STA BA comprises for each wireless station a STA-ID field, a Traffic Identifier (TID) field, BA Starting Sequence Control field, and BA Bitmap field.

10. The MS of claim 6, wherein when DL MU MIMO is supported, said AP is capable of sending BAs to multiple STAs simultaneously and said BAs may be aggregated with data frames.

11. A non-transitory computer readable medium encoded with computer executable instructions, which when accessed, cause a machine to perform operations comprising:
supporting acknowledgement transmissions for Uplink (UL) Multi-user Multiple Input Multiple Output (MU MIMO) or UL OFDMA in wireless networks by enabling an AP operable in said wireless network to send back acknowledgements to different wireless stations (STAs) in communication with said AP either sequentially or simultaneously by defining a new block ack (BAs) type to acknowledge data frames received for multiple STAs, wherein the new BAs type contains BA information field and a BA control field;
wherein with the new BAs type the AP may broadcast or multicast one BA frame that contains information for all STAs from which the AP has received an aggregate MAC protocol data unit (A-MPDU).

12. The non-transitory computer readable medium encoded with computer executable instructions of claim 11, wherein a multi-STA BA contains one BA information field for each STA.

13. The non-transitory computer readable medium encoded with computer executable instructions of claim 12, wherein said BA information field for said multi-STA BA variant comprises a STA-ID field, BA Starting Sequence Control field, and BA Bitmap field.

14. The non-transitory computer readable medium encoded with computer executable instructions of claim 12, wherein said BA information field for said multi-STA BA comprises for each wireless station a STA-ID field, a Traffic Identifier (TID) field, BA Starting Sequence Control field, and BA Bitmap field.

15. The non-transitory computer readable medium encoded with computer executable instructions of claim 11, wherein when DL MU MIMO is supported, said AP is capable of sending BAs to multiple STAs simultaneously and said BAs may be aggregated with data frames.

16. An access point (AP), comprising:
a transceiver adapted for communication with a wireless station (STA) in a wireless network, said transceiver further adapted to support acknowledgement transmissions for Uplink (UL) Multi-user Multiple Input Multiple Output (MU MIMO) or UL OFDMA in said wireless network by enabling said AP to send back acknowledgements to different wireless stations (STAs) in communication with said AP either sequentially or simultaneously by defining a new block ack (BA) type to acknowledge data frames received for multiple STAs, wherein the new BAs type contains a BA information field and a BA control field;
wherein with the new BAs type the AP may broadcast or multicast one BA frame that contains information for all STAs from which the AP has received an aggregate MAC protocol data unit (A-MPDU).

17. The AP of claim 16, wherein a multi-STA BA contains one BA information field for each STA.

18. The AP of claim 17, wherein said BA information field for said multi-STA BA variant comprises a STA-ID field, BA Starting Sequence Control field, and BA Bitmap field.

19. The AP of claim 17, wherein said BA information field for said multi-STA BA comprises for each wireless station a STA-ID field, a Traffic Identifier (TID) field, BA Starting Sequence Control field, and BA Bitmap field.

20. The AP of claim 16, wherein when DL MU MIMO is supported, said AP is capable of sending BAs to multiple STAs simultaneously and said BAs may be aggregated with data frames.

* * * * *